June 29, 1937. J. BIJUR 2,084,998
LUBRICATION
Original Filed Aug. 9, 1922
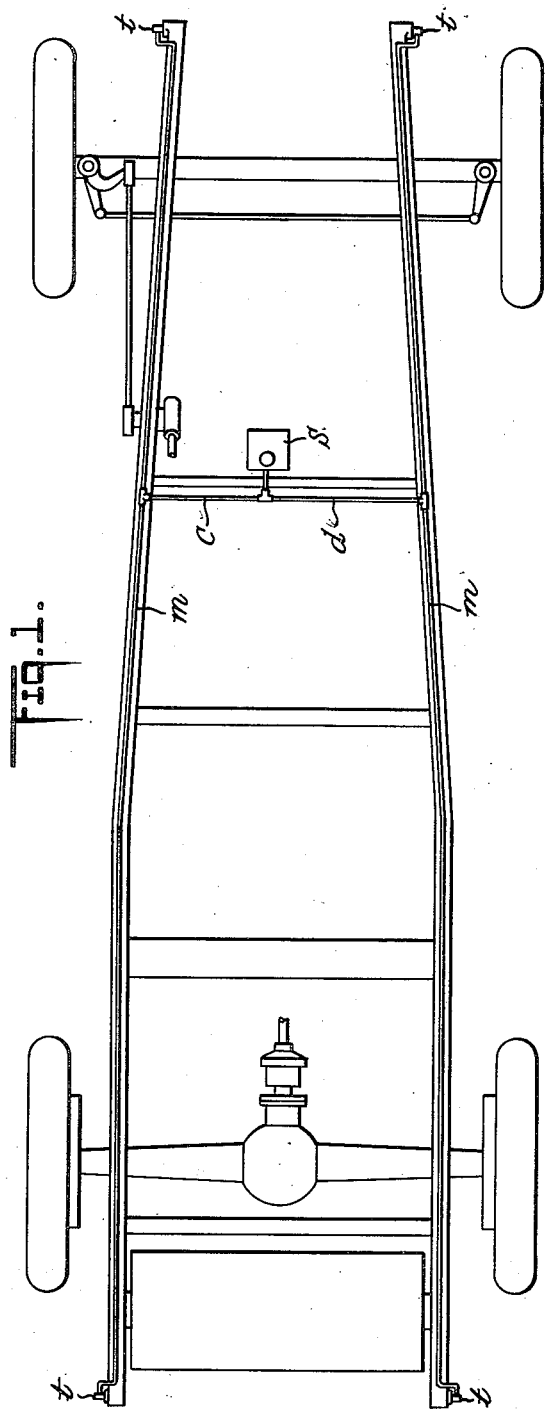
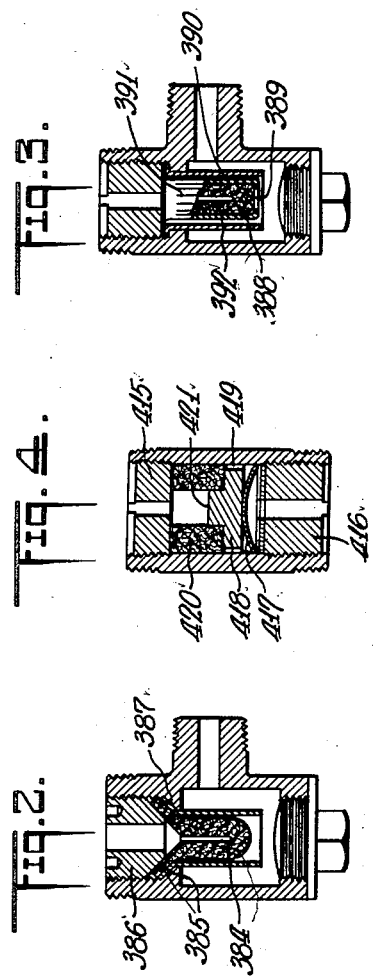
INVENTOR
Joseph Bijur, Deceased
by George Bijur, Executor
BY
ATTORNEYS Patented June 29, 1937

2,084,998

UNITED STATES PATENT OFFICE 2,084,998

LUBRICATION

Joseph Bijur, deceased, late of New York, N. Y., by George Bijur, executor, New York, N. Y.; said Joseph Bijur assignor, by mesne assignments, to Auto Research Corporation, a corporation of Delaware Original application August 9, 1922, Serial No. 580,668. Divided and this application October 9, 1934, Serial No. 747,500

11 Claims. (Cl. 184—7)

The present invention relates primarily to central lubrication and is more especially concerned with valving and/or metering flow control devices for central lubricating systems, for example, of the general type disclosed in issued Patents No. 1,632,771 and No. 1,632,772 of June 14, 1927, and known as "drip plugs", the flow rating of which is not subject to fortuitous variation, and which have a restricting effect predominating over the restricting effect of the longest conduit or tightest bearing, said restricting effect of the metering device often ranging from 10 to several hundred times the restricting effect of said longest line or tightest bearing.

In metering devices of the flow restriction type disclosed in Patents Nos. 1,632,771 and 1,632,772, it is customary to provide separate strainer, valve, and restriction elements, the restriction being preferably of the pin-in-bore type and being relatively fixed in position and the valve being of the flat disk type and being positioned in an outlet socket and enclosed between a valve seat and a valve retainer. The socket may be a large one to receive a coil spring for seating the valve, or a relatively small one with springless valves.

The present application is particularly directed to those fittings in which the lubricant is caused to flow through an elongated and preferably annular body of a porous or absorbent material, preferably outwardly from the axis.

This application is a division of application Serial No. 580,668, filed August 9, 1922 now Patent No. 1,975,920.

In the accompanying drawing in which are shown one or more of various possible embodiments of the several features of the invention, Fig. 1 is a diagrammatic view indicating the application of the central lubricating system of the present invention to a chassis, Fig. 2 is a transverse sectional view on a larger scale showing the construction of one embodiment of a preferred metering drip plug, and Figs. 3 and 4 are views similar to Fig. 2 of other embodiments.

Referring now to the drawing, in Fig. 1, there is shown diagrammatically the general layout of the chassis of an automobile having a lubricant supply unit S, illustratively on the dashboard. The supply unit S may be fed from the engine oil pump or a separate reservoir may be provided and it may include a manually and/or automatically operated pump actuated directly from the machine being lubricated as by a mechanical drive, or indirectly by an inertia motor, a piston motor or a diaphragm motor to feed the bearings intermittently or continuously. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings on the axle or other unsprung parts.

In Fig. 2 the seepage resistance comprises a bag 384 of felt, the edge 385 of which is tightly clamped by the plug 386 against the ledge 387. Preferably, the clamping surfaces of the plug and of the ledge are in this case made oblique for greater effectiveness in the clamping hold.

In Fig. 3 the seepage mass constitutes a plug 388 of felt, cotton or similar porous material held within and against the perforated disk base 389 of a metallic thimble 390, slit longitudinally as at 391. The seepage material is preferably provided with a longitudinal axial hole 392 so that the oil forced thereinto will pass through the plug not only axially through the perforated bottom 389, but also radially from the hole outward through the slits 391.

In Fig. 4 is shown a cylindrical fitting closed at one end by an inlet plug 415 and at the other by an outlet plug 416 between which plugs there is confined a scalloped dished spring washer 417, the edge of which presses upon the outlet plug; a metal plug 418 serrated as at 419 about its periphery snug within the fitting, resting against the convex surface of said spring; and a sleeve member 420 of felt, cotton or other porous or pressure absorbing material being pressed between said block 418 and said inlet plug 415. The block is preferably provided with a boss 421 extending snugly into the sleeve to prevent collapse thereof.

The ring 420 is substantially compressed by the pressure of spring washer 417, transmitted through plug 418, so that in an installation equipped with the seepage fittings of Fig. 4, the annular seepage mass would have its maximum resistance against oil flow as long as the oil is not under pressure. When oil pressure is applied to the line, pressure is exerted against boss 421 of plug 418 through the lubricant within the annular seepage mass, which tends to displace said plug to correspondingly relieve the axial pressure upon the annulus, so that the resistance to radial flow therethrough is lessened somewhat and the oil passes slowly through serrations 419 and past the scallops of spring 417.

Figs. 2, 3 and 4 of the present application correspond respectively to Figs. 31, 32 and 36 of the parent application, Serial No. 580,668, and Fig. 1 of the present application is a simplified showing of Fig. 1 of said parent application.

What is claimed is:—

1. As an element in a lubricating system in combination, a pipe fitting having a compressible member therein offering high resistance to flow, a compression element to compress said member, spring means pressing said element to maintain said member under compression, and arranged to be opposed by oil pressure on the line to reduce the compression of the member to permit seepage of oil therethrough.

2. As an element in a lubricating system, in combination, a pipe fitting having an annular seepage resistance across the bore thereof and a liquid seal structure between the seepage resistance and the outlet from said fitting, trapping lubricant to seal the fitting against entry of air.

3. A flow metering device for a central lubricating system comprising a bag of porous material arranged between the inlet and the outlet of the fitting, said bag being tightly clamped adjacent its periphery.

4. A flow metering device comprising a member including an annular body of a porous resistant material, said annular body being clamped within a fitting and said device being provided with means to feed lubricant interiorly of said annular body and receive lubricant exteriorly of said annular body.

5. A restriction element comprising a body, an annular mass of a compressible material therein, serving as the restriction element and means to compress said compressible mass, feed lubricant to the interior of said mass and receive lubricant from the exterior of said mass.

6. In a centralized lubricating installation, a restriction element consisting of a compressible material, an inlet to the interior of said compressible material and a chamber to receive lubricant from the exterior of said compressible material, said compressible material being substantially compressed to afford a high restricting effect.

7. In a restriction construction, an annular casing, an inlet element, an outlet element, a member including an annular mass of a compressible material positioned between said elements, the inlet element feeding the interior of said mass and the outlet element drawing off lubricant from the exterior of said mass.

8. In a restriction construction, a mass of compressible material serving as a restriction element and a slitted cup receiving and holding said compressible material, said slitted cup being adapted to expand to permit flow of lubricant from the exterior of the mass.

9. In a restriction device, a compressible mass serving as a restriction element, automatically adjustable means determining the degree of compression of said mass, and outlet and inlet elements feeding lubricant to and taking lubricant away from said mass.

10. In a restriction device, a restriction element, an automatically adjustable means to vary the restricting effect thereof to give an increased restriction with lower lubricant pressures and a decreased restriction with higher lubricant pressures.

11. In a restriction device, a bag of felt suspended therein as a restricting element and a casing for such bag of felt.

GEORGE BIJUR,
*Executor of the Estate of Joseph Bijur, Deceased.*